Patented Apr. 26, 1932

1,855,306

UNITED STATES PATENT OFFICE

PAUL NAWIASKY AND ALFRED EHRHARDT, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF BROWN VAT DYESTUFFS OF THE DIAZINE BENZANTHRONE SERIES

No Drawing. Application filed October 19, 1928, Serial No. 313,639, and in Germany November 9, 1927.

We have found that new brown vat dyestuffs are obtained by treating the oxidized leuco compound obtained by reduction of the brown vat dyestuff probably corresponding to the formula:

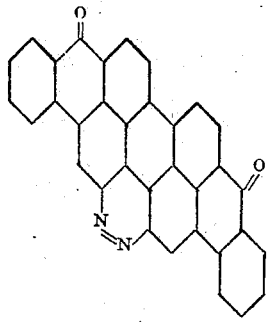

(obtainable by oxidizing the product obtained by treating with an alcoholic potash melt the aminobenzanthrone prepared by reduction of the nitrobenzanthrone produced by acting on benzanthrone with nitric acid in boiling glacial acetic acid) with halogenating agents in the presence or absence of halogenation catalysts, for example, ferric chlorid or iodine. The dyestuffs thus produced contain halogen and nitrogen, and, in addition to other remarkable properties, possess great purity of tone and fastness to chemicking.

The following examples will further illustrate the nature of the said invention which however is not limited thereto. The parts are by weight.

Example 1

5 parts of the product obtained by reducing the aforesaid brown dyestuff with sodium hydrosulphite and caustic soda solution, followed by aeration, are suspended in 250 parts of nitrobenzene, and treated with 1 part of ferric chlorid and 25 parts of bromine. The reaction mixture is then slowly heated to 80° centigrade and is maintained at that temperature for 20 hours. On cooling, the dyestuff is filtered by suction and washed with benzene, alcohol and water. It dissolves to a violet solution in concentrated sulfuric acid, and gives blue dyeings on cotton from a blue vat, the color changing, on exposure to the air, to a brown which is very fast to washing, boiling in a solution of soda and light. Treatment with chlorine improves the purity of the shade.

Example 2

5 parts of the reduction product described in Example 1 are heated to 60° centigrade with 100 parts of sulfuryl chlorid for 8 hours, the reaction mixture being then further treated in the usual manner. The resulting dyestuff gives a violet solution in sulfuric acid, and dyes cotton, from a blue vat, in blue shades which, on exposure to the air, change into a brown shade exhibiting excellent properties in respect of fastness.

Example 3

5 parts of the reduction product described in Example 1 are suspended in 125 parts of water and treated with 25 parts of bromine. The reaction mixture is then slowly heated to 80° centigrade and, after being kept at that temperature for several hours, is treated as usual. The dyestuff has substantially the same properties in respect of fastness as that of Example 1.

What we claim is:

1. As a new article of manufacture vat dyestuffs containing halogen and nitrogen, dissolving to a violet solution in concentrated sulfuric acid, giving blue dyeings on cotton from a blue vat, the color changing on exposure to the air to brown and obtainable by halogenation of the oxidized leuco compound obtained by reduction of the vat dyestuff corresponding probably to the formula:

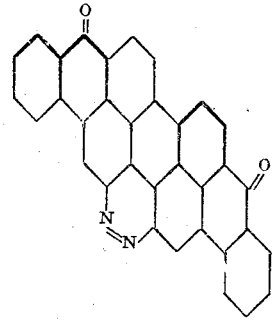

which is obtainable by oxidizing the product obtained by treating with an alcoholic potash melt the aminobenzanthrone prepared by reduction of the nitrobenzanthrone produced by acting on benzanthrone with nitric acid in boiling glacial acetic acid.

2. A process of producing brown vat dyestuffs which consists in causing a halogenating agent to react on the oxidized leuco compound obtained by reduction of the vat dyestuff corresponding probably to the formula:

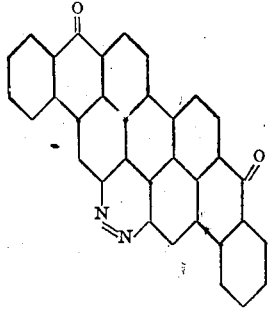

which is obtainable by oxidizing the product obtained by treating with an alcoholic potash melt the aminobenzanthrone prepared by reduction of the nitrobenzanthrone produced by acting on benzanthrone with nitric acid in boiling glacial acetic acid.

3. A process of producing brown vat dyestuffs which consists in causing a halogenating agent to react, in the presence of a halogenation catalyst, on the oxidized leuco compound obtained by reduction of the vat dyestuff corresponding probably to the formula:

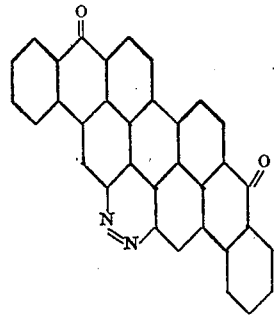

which is obtainable by oxidizing the product obtained by treating with an alcoholic potash melt the aminobenzanthrone prepared by reduction of the nitrobenzanthrone produced by acting on benzanthrone with nitric acid in boiling glacial acetic acid.

In testimony whereof we have hereunto set our hands.

PAUL NAWIASKY.
ALFRED EHRHARDT.